Nov. 2, 1926.
O. C. PAPIN
FAUCET
Filed August 4, 1923
1,605,765
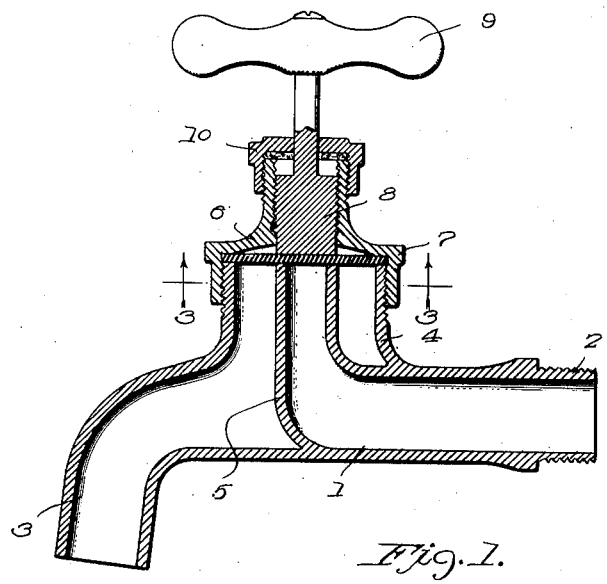
Fig. 1.
Fig. 2.
Fig. 3.
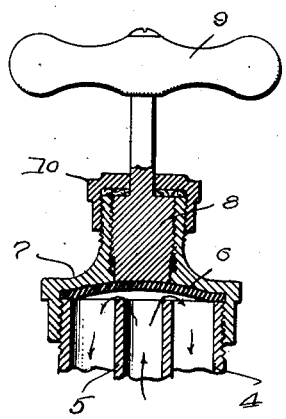
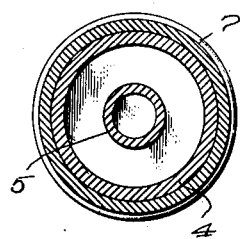
Oscar C. Papin
INVENTOR
BY Victor J. Evans
WITNESS:
ATTORNEY Patented Nov. 2, 1926.

1,605,765

UNITED STATES PATENT OFFICE.

OSCAR CARL PAPIN, OF DUBUQUE, IOWA.

FAUCET.

Application filed August 4, 1923. Serial No. 655,616.

The object of this invention is to produce a water faucet which shall be leak-proof and which shall be of such construction that repairs thereto such as replacing the valve, or regrinding the valve seat may be made in an easy and expeditious manner.

A further object is to produce a faucet in which the valve is in the nature of a compressible disk of leather, rubber or the like, and which is unseated by the pressure of water thereagainst, a threaded plunger member being provided for holding the valve seated.

The foregoing and other objects which will present themselves as the nature of the invention is better understood, may be accomplished by a construction, combination and operative association of parts such as is disclosed by the drawings which accompany and which form part of this application.

In the drawings:—

Figure 1 is a substantially vertical longitudinal sectional view through a faucet in accordance with this invention, the valve being seated.

Figure 2 is a substantially similar view with the valve unseated.

Figure 3 is a sectional view on the line 3—3 of Figure 1.

The body of the faucet is broadly indicated by the numeral 1, the same having a threaded end 2 and the usual rounded outlet end 3. The body is provided at its top with the usual annular enlargement 4 which is exteriorly threaded for the major portion of its length.

In the present instance, there is integrally formed with the body a pipe-like extension 5 that is disposed centrally of the exteriorly threaded chamber 4. The pipe member 5 communicates with the inlet water end of the body, and the upper end thereof provides a seat for a disk valve 6. The valve is in the nature of a compressible member, being of leather, rubber or some composition and the outer edge thereof rests on the upper end of the chamber 4.

Screwed on the threaded neck of the chamber 4 there is a bonnet 7 which forces the valve 6 against the upper edge of the chamber 4. The annular threaded flange of the bonnet is comparatively wide to prevent leakage between the same and the chamber 4, but the compression of the valve between the bonnet and chamber also serves to prevent such leakage.

The neck 7 of the bonnet is provided with interior threads which are engaged by exterior threads on a plunger 8. The plunger is formed with a reduced outer extension. The neck of the bonnet is also provided with exterior threads which are engaged by a cap nut 10, the reduced extension or spindle of the plunger 8 passing through a central opening in the said nut 10. The handle proper is detachably connected to the spindle.

The handle 9 may, of course, be in the nature of a wheel and when the same is operated to screw the plunger in the direction of the valve C, the contacting engagement of the said plunger with the valve will force the same tightly upon its seat. When the plunger is turned in another direction, as disclosed in Figure 2 of the drawings, the pressure of water entering the pipe member 5 will force the valve 6 away from its seat, permitting said water to flow through the outlet end 3 of the body. By reference to Figure 2 of the drawings it will be seen that when the valve 6 is unseated the same will contact with the inner concaved wall in the bonnet 7, and also with the inner end of the plunger 8. It will thus be noted that when the valve is unseated the same is afforded an effective rest so that the valve cannot be subjected to distortion, and this, of course, is also true when the valve is seated, as the same is effectively held in such position by the contacting engagement of the plunger therewith.

My improved bib or faucet may be cheaply constructed, and as the seat for the valve is arranged in a line with the top of the chamber 4, the same may be readily reground, should the said seat become worn which, however, is not liable to occur. The valve 6 is constructed of cheap material and when worn may be readily replaced by simply removing the bonnet.

Having described the invention, I claim:—

A faucet having its body provided at its top with an exteriorly threaded cylindrical chamber and having a pipe extension connected with its inlet portion and disposed centrally in the chamber and terminating in a plane with the outer edge of the chamber, a disk valve seated on the outer edge of the chamber, a bonnet having an inner concaved wall screwed on the chamber to contact with the periphery of the valve to hold the same positioned, and a handle operated plunger screwed through the bonnet for contacting the valve to hold the same seated on the pipe extension when the faucet is closed, and said valve, when opened, designed to rest on the concaved inner face of the bonnet and on the inner end of the plunger.

In testimony whereof I affix my signature.

OSCAR CARL PAPIN.